US006133919A

United States Patent [19]

Bormann et al.

[11] Patent Number: 6,133,919

[45] Date of Patent: Oct. 17, 2000

[54] METHOD AND APPARATUS FOR USING A GRAPHICAL USER INTERFACE (GUI) AS THE INTERFACE TO A DISTRIBUTED PLATFORM SWITCH

[75] Inventors: Richard J. Bormann, Howell, N.J.; Ann C. Fulop, Bloomington, Ill.; Steven J. Shute, Yardley, Pa.; Radakichenane Vengatatry, Edison; Phillip A. Weeks, Little Silver, both of N.J.

[73] Assignee: AT&T Corp., New York, N.Y.

[21] Appl. No.: 08/985,862

[22] Filed: Dec. 5, 1997

Related U.S. Application Data

[60] Provisional application No. 60/051,568, Jul. 2, 1997.

[51] Int. Cl.[7] .............................. G06F 3/00; G06F 11/32

[52] U.S. Cl. .......................... 345/349; 345/356; 345/969; 709/223; 709/224

[58] Field of Search .................................... 345/326, 335, 345/339, 349, 356, 961, 965, 966, 969; 395/200.53, 200.54; 709/223–224

[56] References Cited

U.S. PATENT DOCUMENTS

| | | | |
|---|---|---|---|
| 5,483,631 | 1/1996 | Nagai et al. | 345/329 |
| 5,504,921 | 4/1996 | Dev et al. | 395/200.53 |
| 5,675,756 | 10/1997 | Benton et al. | 345/349 |
| 5,751,962 | 5/1998 | Fanshier et al. | 395/200.53 |
| 5,751,965 | 5/1998 | Mayo et al. | 395/200.54 |
| 5,761,412 | 6/1998 | Higgins | 714/47 |
| 5,761,429 | 6/1998 | Thompson | 709/224 |
| 5,802,383 | 9/1998 | Li et al. | 345/356 X |
| 5,809,265 | 9/1998 | Blair et al. | 345/339 |
| 5,889,954 | 3/1999 | Gessel et al. | 709/223 |
| 5,974,237 | 6/1998 | Shurmer et al. | 709/224 |

*Primary Examiner*—Raymond J. Bayerl
*Assistant Examiner*—X. L. Bautista
*Attorney, Agent, or Firm*—Kenyon & Kenyon

[57] ABSTRACT

A graphical user interface (GUI) can support the effective and efficient supervision of increasingly complex distributed switching hardware and software. The GUI can support a concurrent view of all processors and linkages comprising a distributed switching platform. The GUI can present users with a visual representation of all processors in the distributed switch and with a direct way to supervise those processors.

26 Claims, 4 Drawing Sheets

COMMUNICATION NETWORK
140
NON-DISTRIBUTED SWITCH
130
100
DISTRIBUTED SIGNALING PROCESSORS
121
DISTRIBUTED GATEWAY MODE PROCESSORS
123
DISTRIBUTED SWITCH
101
HUB
110
DISTRIBUTED CALL PROCESSORS
120
DISTRIBUTED ADMINISTRATIVE PROCESSORS
122
WORKSTATION
150

METHOD AND APPARATUS FOR USING A GRAPHICAL USER INTERFACE (GUI) AS THE INTERFACE TO A DISTRIBUTED PLATFORM SWITCH

CROSS-REFERENCE TO A RELATED PATENT APPLICATIONS

This patent application claims the benefit of U.S. Provisional Application No. 60/051,568 entitled Graphical User Interfaces and Reusable Java Components For Use With A Distributed Platform Switch, filed on Jul. 2, 1997.

This patent application is related to the following commonly assigned U.S. Patent applications with the same inventors: A Method and Apparatus for Supervising a Distributed Platform Switch Through Graphical Representations, Ser. No. 08/985,866, filed Dec. 5, 1997, A Method And Apparatus For Supervising A Processor Within A Distributed Platform Switch Through Graphical Representations, Ser. No. 08/986,220, filed Dec. 5, 1997, Reusable Software Components for a Graphical User Interface for a Distributed Network Switch, Ser. No. 08/985,775, filed Dec. 5, 1997, A Reusable Light-Emitting Diode (LED) Canvas Software Component For A Graphical User Interface, Ser. No. 08/986,219, filed Dec. 5, 1997, A Reusable Sparing Cell Software Component For A Graphical User Interface, Ser. No. 08/986,218, filed Dec. 5, 1997; and A Reusable Reversible Progress Indicator Software Component For A Graphical User Interface, Ser. No. 08/985,865, filed Dec. 5, 1997.

FIELD OF THE INVENTION

The present invention generally relates to the field of distributed computing and the field of telecommunications. Specifically, the present invention relates to using a graphical user interface (GUI) as the interface to a distributed platform switch.

BACKGROUND

Traditionally, telecommunications switches have been represented and maintained through the use of one or more character-based computer tools. Because single-processor switch architectures are being replaced with distributed multi-processor switch architectures, character-based computer maintenance tools are particularly problematic. These distributed multi-processor switch architectures can have, for example, processors or processor groups taking on specialized functions having high-speed interconnections. Character-based computer maintenance tools cannot effectively represent the added complexity of these distributed multi-processor switch architectures.

For example, the interface for a character-based switch-maintenance tool typically supports direct status display and control over only one processor at a time. The direct status display and control of a single processor is based a procedure that requires logging into that processor to perform maintenance on it.

Known character-based switch-maintenance tools, however, suffer several shortcomings. First, single-processor control cannot effectively provide a visual overview of a distributed switch environment that consists of many processors with many interconnections. In such a distributed switch environment, the many processors and the many interconnections may require monitoring and control. Single-processor control used in a distributed processor platform places the burden on the user to construct an integrated conceptual view of the status of the processor complex. Additionally, resolution limitations of character-based interfaces restrict the amount of detail that can be presented to users in a single view.

Second, known character-based switch-maintenance systems require users to have appropriate knowledge of switching maintenance and also have detailed knowledge about how to formulate commands to accomplish their goals. Users, for example, need to know whether a failed processor needs to be rebooted or initialized, and need to know the string of parameters included in a maintenance command. The user can obtain proficiency in using these command languages only with substantial experience; the user, however, is still subject to error (e.g., typos) and inefficiencies (e.g., constructing such complex command strings requires some time). Consequently, known character-based switch-maintenance tools cannot provide a sufficiently accurate and direct means of viewing status and controlling the hardware and software of a distributed telecommunications switch.

SUMMARY OF THE INVENTION

A graphical user interface (GUI) can support the effective and efficient maintenance of increasingly complex distributed switching hardware and software. The GUI can support a concurrent view of all processors and linkages comprising a distributed switching platform. The GUI can present users with a visual representation of all processors in the distributed switch and with a direct way to view and maintain those processors. Consequently, through a single log-in procedure, users can be provided access to a virtual switch control panel for the entire set of processors and interconnections that comprise the switch platform.

The GUI allows the user to control the presentation of information. The user can control the amount of information presented and can gain the appropriate level of detail needed to support various types of supervision activities. For example, by presenting an overall view of the processors in the platform, the user can have an overview of general "health" of the distributed platform switch, and can operate on the switch as a whole, on individual clusters of components and/or individual processors. Additionally, if maintenance requires interaction on the components within a single processor, the user can obtain a virtual view of cabinet contents (hardware and software) and their states.

The GUI can support unified, consistent, and standardized supervision procedures thereby increasing user accuracy and efficiency. The GUI can ensure that all available actions become visually explicit thereby enabling only appropriate actions to be taken on selected objects. This feature of the GUI reduces the chances of inappropriate supervision actions being taken on a selected object. Moreover, the user is not required to remember and to enter long, error-prone character strings to perform supervision activities. Rather the user can select an object of interest and then select the supervision operation to be performed. Additional GUI features include providing immediate feedback to actions initiated by the user, and providing more opportunities for redundant coding of information. For example, redundant coding of information can be embodied through the use of color and text to convey state information.

Through the use of the GUI, the user interacts with a graphical representation of the hardware and software that makes up the distributed platform switch, which looks and operates much like a physical control panel. In other words, the user appears to be co-located with and operating on the actual piece of equipment. Thus, the GUI effectively supports a model of distributed switch maintenance in which users in a centralized location perform maintenance remotely upon one or more distributed switches. The direct representations and interactivity that the GUI provide make this maintenance model efficient, and contribute to minimizing maintenance procedural errors.

The workstation receives state information from a distributed switch processor within the distributed switch processors. The graphical-user interface (GUI) is constructed at the workstation using the state information. The GUI is displayed showing state information about any distributed switch processor from the distributed switch processors to the user. Alternatively, the GUI can show to the user state information about all the distributed switch processors, a hub interconnecting the distributed switch processors, and/or the connections between the distributed switch processors and the hub.

The GUI can receive and display updated state information. A subset of the displayed state information can correspond to the physical hardware layout of a portion of the distributed switch.

A distributed processor of the distributed switch can receive the request from a workstation for state information. The distributed processor can send the state information to the workstation. The state information allows the workstation to construct the GUI and to display the GUI showing state information about any distributed switch processor from the plurality of distributed switch processors to the user.

DETAILED DESCRIPTION

Figure 1:
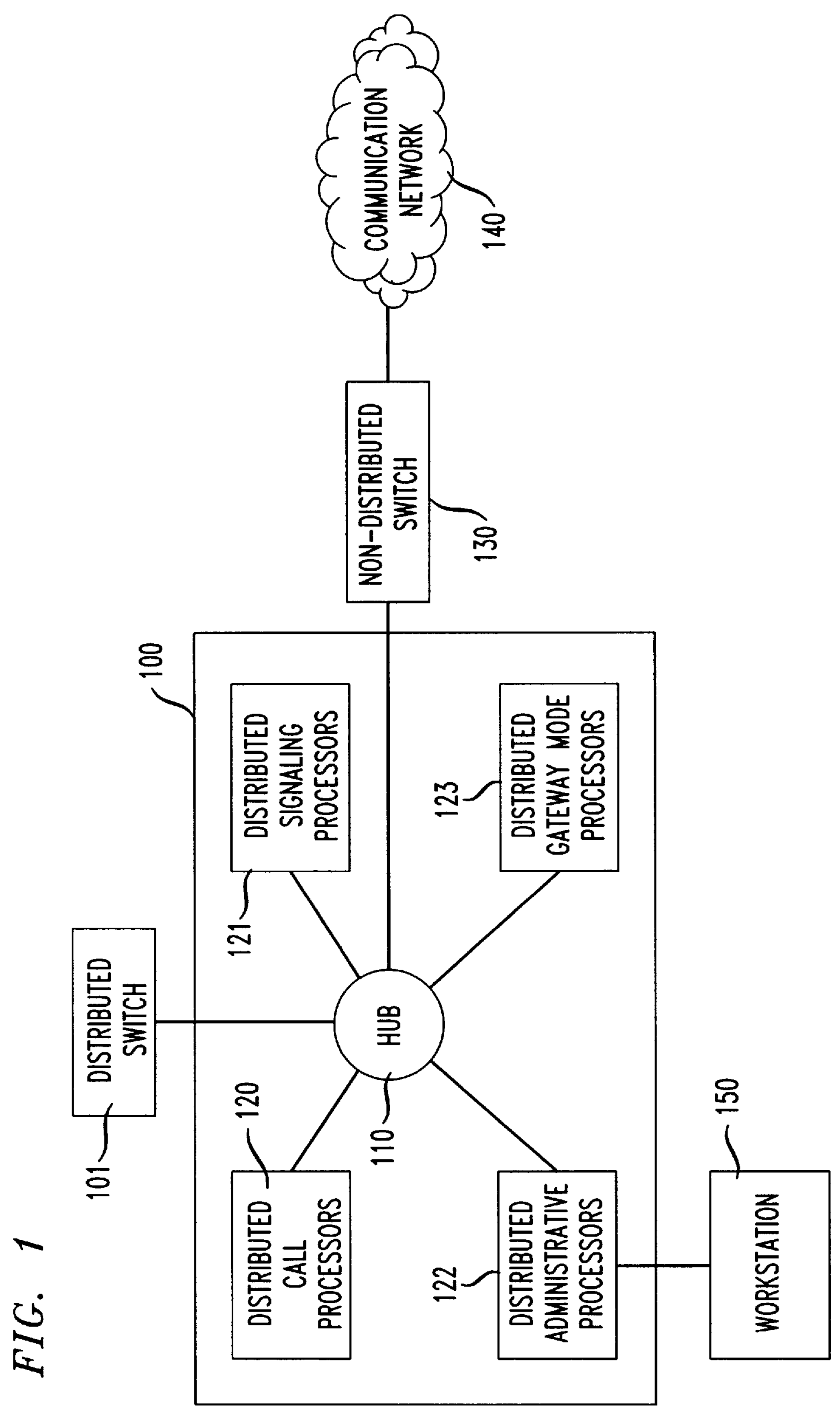
FIG. 1 shows a network of distributed processors according to an embodiment of the present invention.

FIG. 1 shows a network of distributed processors according to an embodiment of the present invention. Distributed switch 100 comprises hub 110, distributed call processors 120, distributed signaling processors 121, distributed administrative processors 122, and distributed gateway node processors 123. Hub 110 connects distributed processors 120 through 123. Hub 110 also can connect distributed switch 100 to non-distributed switch 130 or can connect directly to communication network 140. Non-distributed switch 130 is connected to communications network 140, or directly can connect to communication network 140. Distributed switch 100 can also be connected to another distributed switch, such as distributed switch 101. Workstation 150 is connected to one administrative processor from distributed administrative processors 122. Alternatively, workstation 150 can be connected to hub 110.

Although FIG. 1 shows a certain configuration of distributed switch 100, other configurations are possible. For example, although FIG. 1 shows the functionality of distributed switch 100 divided into various groups, the functionality can be divided into other arrangements. Although distributed switch 100 is shown in FIG. 1 as being distributed using a hub configuration, other configurations, such as ring or star configurations, are possible.

Similarly, although FIG. 1 shows certain interconnections between distributed switch 100, non-distributed switch 130 and communications network 140, other interconnections are possible. For example, distributed switch 100 can be connected to other distributed switches not shown.

Hub 110 is a device interconnecting distributed processors 120 through 123. Hub 110 provides internal messaging capabilities for distributed switch 100. In other words, hub 110 determines how internal messages are routed to distributed processors 120 through 123 and controls the timing related to the processing of those internal messages. Hub 110 can be, for example, an asynchronous transfer mode (ATM) switch such as the Enterprise Hub by Xyplex Networks. Hub 110 can cooperate with a redundant back up system referred herein as a maintenance alternate access (MAA) (not shown). The MAA can interconnect distributed processors 120 through 123 through RS232 and/or Ethernet connections to provide higher reliability than is possible with only a hub using ATM connections.

Distributed processors 120 through 123 each comprise a set of processors performing specialized functions. More specifically, distributed call processors 120 perform call processing; distributed signaling processors 121 perform CSS7 (Common Channel Signaling System 7) signaling; distributed administrative processors 122 perform administrative functions such as logging events and performing alarm intelligence; and distributed gateway node processors 123 connect switch 100 to adjunct platforms such as, for example, a billing system. Distributed call processors 120 can include, for example, three to twelve call processors; distributed signal processors can include, for example, two to six signal processors; distributed administrative processors can include, for example, two to six administrative processors.

Distributed processors 120 through 123 can be fault-tolerant, discrete-event processors, such as those manufactured by Tandem Computers, Inc. or Stratus Computer, Inc. Each processor in distributed processors 120 through 123 can comprise a central processing unit (CPU), computer-readable memory, a network port and a data bus connecting the CPU, computer-readable memory and the network port.

Workstation 150 comprises a processor, a computer-readable memory, an input port to be coupled to an input device such as a keyboard, an output port to be coupled to an output device such as a monitor, a switch port to be coupled to distributed switch processor 120, a databus. The databus can connect the processor, the computer-readable memory, the input port, the output port and the switch port. Workstation 150 can be, for example, any computer that can run instructions programmed in the Java™ programming language by Sun Microsystems, Inc.® and includes a Java Virtual Machine (JVM). Consequently, when workstation 150 having the JVM downloads instructions, the instructions can be interpreted into machine code specific to workstation 150. For example, workstation 150 can be a personal computer or the SPARCstation™ 4 workstation by Sun Microsystems.

Workstation 150 runs appropriate software, such as a WEB browser like Netscape Navigator® by Netscape Communications Corp., Hot Java™ by Sun Microsystems, or a separate program like Sun Microsystems' appletviewer or other JAVA-compatible software. For example, workstation 150 can use Netscape Navigator to receive and operate Java applets.

Workstation 150 can receive data through the switch port from an administrative processor in distributed administrative processors 122. The data received by workstation 150 can include data used to construct a graphical-user interface (GUI) and can include state information indicating the state of the distributed switch components. The state information can, for example, include status information and/or alarm information about the distributed switch components.

The data used by workstation 150 to construct the GUI can be, for example, Java applets downloaded from an administrative processor in distributed administrative processors 122. The Java applets can be programs that perform the drawing functions and provide graphical objects with which a user can interact.

The GUI can be any type of graphic-based interface such as a window-type display containing graphic elements that represent various elements of the distributed switch. For example, each processor from distributed switch processors 120 through 123, hub 110 and their respective interconnections can be represented by a graphic element with the GUI. The GUI can also be integrated within a multimedia presentation including audio, text, animation.

The GUI can provide status information about the elements within distributed switch 100 in a hierarchical manner. In other words, the GUI can provide top-level status information about all switch elements, lower level status information about a particular switch element, and finally, even lower level status information about specific components within a particular switch element.

More specifically, the GUI can provide top-level status information about all elements within distributed switch 100 concurrently. Top level status information can include whether switch elements are operational. Because the switch elements have different switch functionality, status information for each type of switch element is determined in different manners. For example, status information for hub 110 is different in nature than status information for distributed call processors 120. The GUI displays the status information for the different types of switch elements regardless of specific switch functionality associated with the various switch elements.

Additionally, the GUI can provide status information on the various switch elements regardless of their specific makes and models. For example, the GUI can provide status information for processors of distributed administrative processors 122 manufactured by Tandem Computers, Inc. and/or manufactured by Stratus Computer, Inc.

Each switch element can include at least one redundant unit. The GUI can indicate the operational status of all redundant units for each switch element. For example, in the case where hub 110 has two redundant units, the graphic presentation of hub 110 in the GUI can comprise two halves each with its own color to indicate the status of both hub units.

Figure 2:
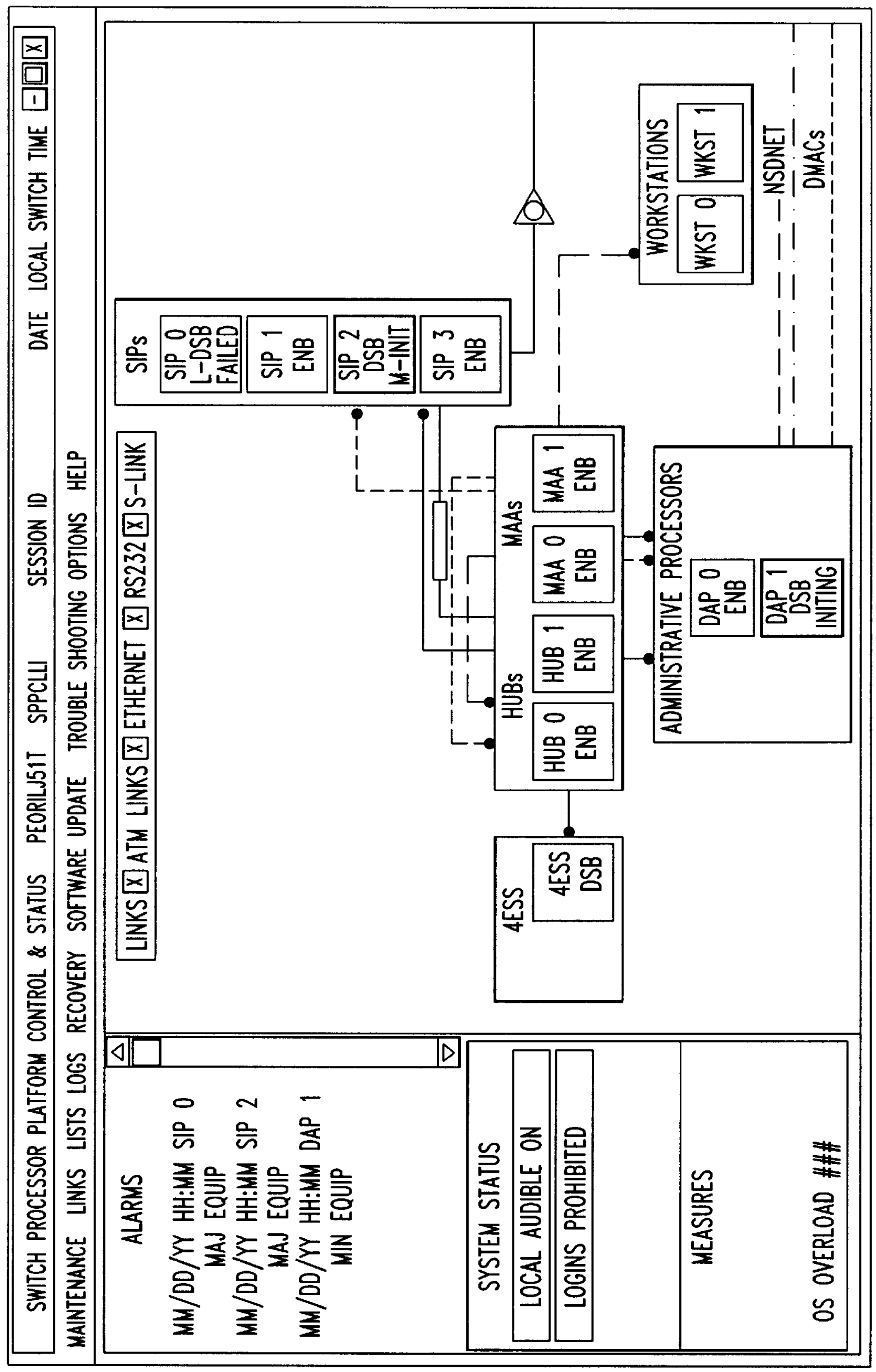
FIG. 2 illustrates an example of a GUI screen showing state information about the elements within a distributed switch, according to an embodiment of the present invention.

FIG. 2 illustrates an example of a GUI screen showing state information about the elements within a distributed switch, according to an embodiment of the present invention. FIG. 2 shows the switch elements for a distributed switch: a non-distributed switch labeled "4ESS", hubs, administrative processors and workstations. As shown in FIG. 2, the hubs includes two redundant units labeled "Hub 0" and "Hub 1"; the workstations includes two redundant units labeled "Wkst 0" and "Wkst 1". Text within the graphic element can indicate the status of each switch element; for example, the label "Enb" indicates that the switch element is enabled.

The user can obtain lower level state information about a particular switch element. The user can select the particular switch element by, for example, double clicking the graphic representation of that particular switch element. The GUI can then display graphic representation of the components that comprise a given switch element.

State information about a particular switch element can provide the user virtual control of the switch element. In other words, the graphic objects displayed to the user can be presented in such a manner to have realworld correspondence to actual hardware.

Figure 3:
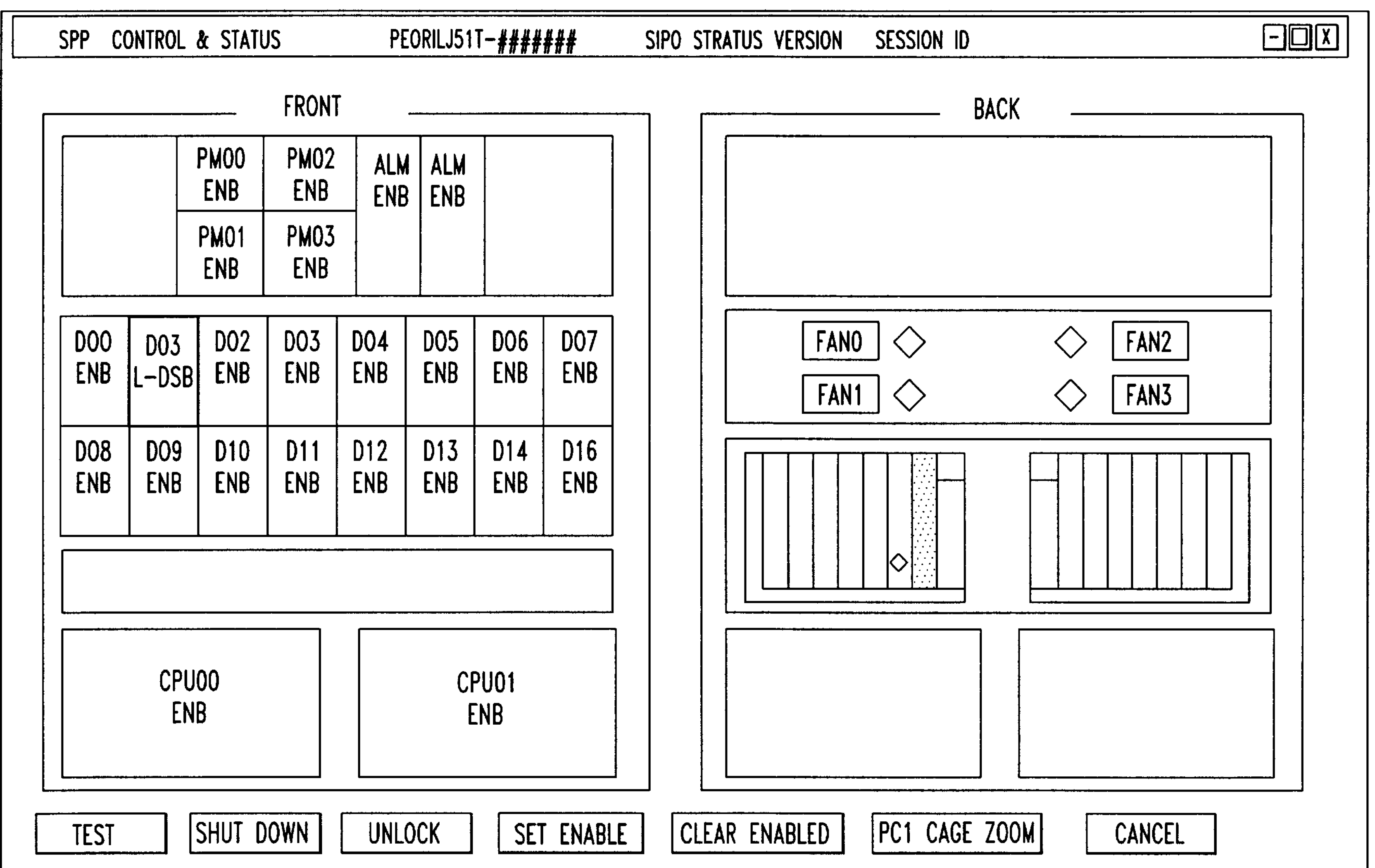
FIG. 3 illustrates an example of a GUI screen showing state information about a particular switch element, according to an embodiment of the present invention.

FIG. 3 illustrates an example of a GUI screen showing state information about a particular switch element, according to an embodiment of the present invention. The example shown in FIG. 3 relates to state information about an administrative processor in distributed administrative processors 122.

As shown in FIG. 3, the left half of the GUI screen corresponds to the physical front layout of the actual hardware of the administrative processor; the right half of the GUI screen corresponds to the physical back layout of the actual hardware of the same administrative processor. The example illustrated in FIG. 3 indicates that the processor component corresponding to the graphic element having a label "D 01" is locked, disabled and not operating properly. This state information is indicated on the left half of the GUI by the red color of the graphic element and the text "L-Dsb".

By providing the GUI to correspond to the represented hardware of the switch element, the user can monitor and control switch elements without being co-located with the switch elements. The user can remotely identify problems and relay relevant information to maintenance staff co-located with the switch element. Returning to the example illustrated in FIG. 3, once the GUI user has identified a problem exists with component "D 01", the user can instruct maintenance staff co-located with the switch element to replace the component in the third row from the top and the second from the left when viewing the switch element from the front. Consequently, the physical correspondence incorporated into the GUI allows the GUI user to monitor and control more effectively and efficiently from a remote location.

Finally, an additional layer of state information for the components of a switch element can be provided. For example, state information can be defined for switch element components such as the central processing unit (CPU), disks, input/output (I/O) cards and fan units. State information can also be defined for some subcomponents such as the input port and output port of the I/O cards.

Figure 4:
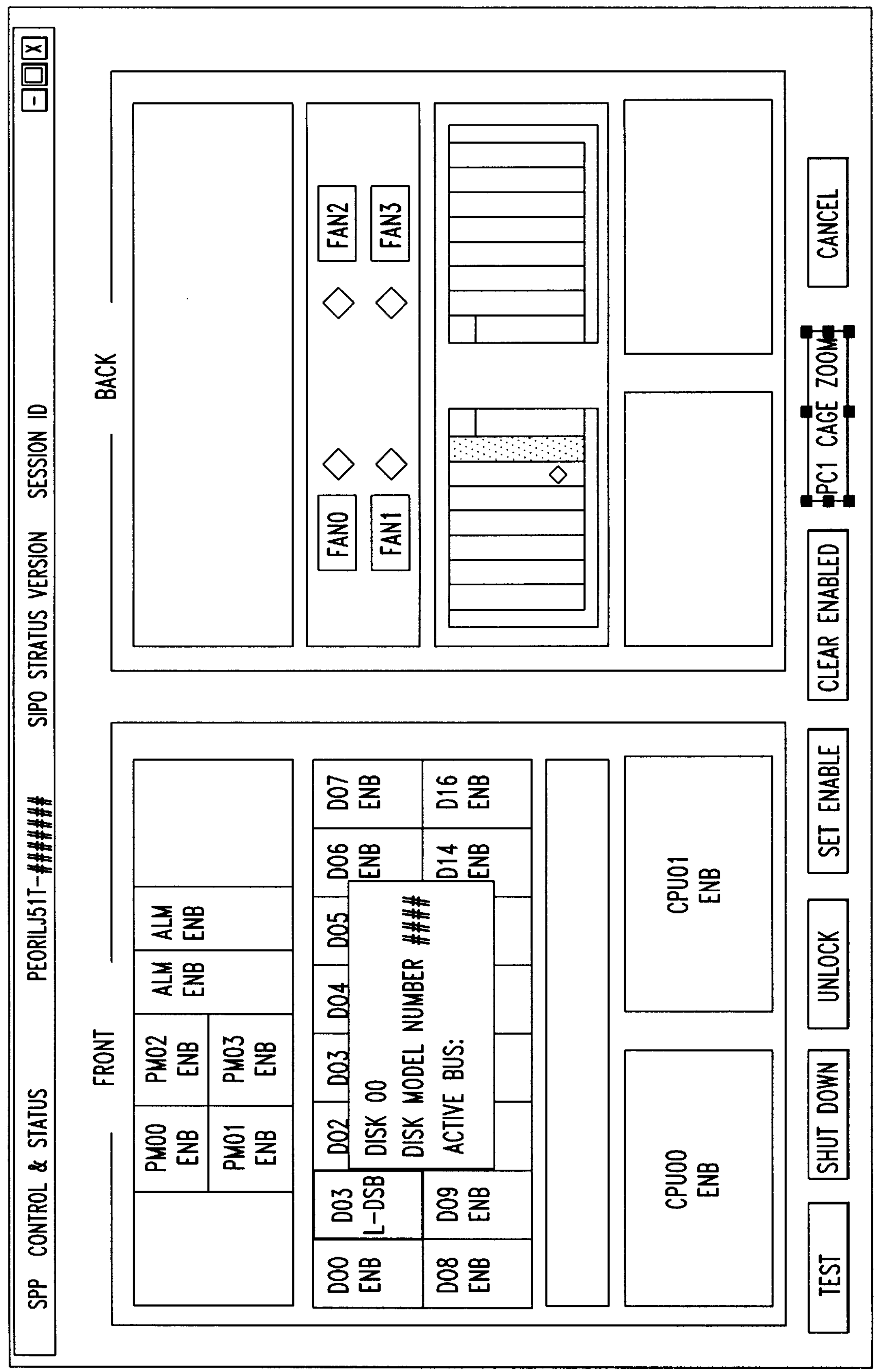
FIG. 4 illustrates an example of a GUI screen with a pop-up menu showing detailed state information about a particular component within a particular switch element, according to an embodiment of the present invention.

FIG. 4 illustrates an example of a GUI screen with a pop-up information panel accessed by a pop-up menu showing detailed state information about a particular component within a particular switch element, according to an embodiment of the present invention. More specifically, FIG. 4 shows a pop-up information panel displaying detailed state information for a particular disk in an administrative processor. As FIG. 4 shows, the pop-up information panel can display state information such as the disk model number and the active bus state.

It should, of course, be understood that while the present invention has been described in reference to particular system components and GUI configurations, other system configurations and GUI configurations should be apparent to those of ordinary skill in the art. For example, although the distributed switch is shown with a hub-interconnection configuration, other configurations such as star-interconnection or loop-interconnection configurations are possible.

Similarly, although the GUI is shown in a particular format and with particular arrangements, other formats and arrangements are possible. For example, although the graphic elements have a square shape to represent particular switch elements or switch element components, other shapes can be used to represent elements or components. More specifically, a fan in an administrative processor can be represented with a circle, especially when the fan is actually circular in shape.

What is claimed is:

1. A method for supervising a distributed switch having a plurality of distributed switch processors, comprising:

receiving state information at a workstation from a distributed switch processor within the plurality of distributed switch processors, said plurality of distributed switch processors being grouped into a plurality of distributed switch function subsets, each distributed switch function subset of said plurality of distributed switch function subsets having at least one distributed switch processor, the at least one distributed switch processor of each distributed switch function subset to perform one specialized function of a plurality of specialized functions;

constructing a graphical-user interface (GUI) at the workstation using the state information;

displaying the GUI at the workstation, the GUI including a first GUI component associated with a first distributed switch function subset, the first GUI component showing state information about a first distributed switch processor of the first distributed switch function subset, and a second GUI component associated with a second distributed switch function subset, the second GUI component showing state information about a second distributed switch processor of the second distributed switch function subset.

2. The method of claim 1, wherein said displaying the GUI step includes displaying the GUI showing state information about all distributed switch processors from the plurality of distributed switch processors.

3. The method of claim 1, wherein said displaying the GUI step includes displaying the GUI showing state information about a hub interconnecting the plurality of distributed switch processors.

4. The method of claim 3, wherein said displaying the GUI step includes displaying the GUI showing state information about a connection between a distributed switch processor of the plurality of distributed switch processors to the hub.

5. The method of claim 1, further comprising:

receiving a command at the workstation from a user through the GUI; and sending an instruction to the distributed switch based on the command received in said receiving a command step.

6. The method of claim 5, wherein said receiving state information step and said displaying the GUI step are repeated with updated state information based on the command received in said receiving a command step.

7. The method of claim 1, further comprising:

receiving a command at the workstation from the user through the GUI;

modifying the GUI based at least in part on the command received in said receiving a command step;

displaying a modified GUI showing a subset of the state information of the distributed switch.

8. The method of claim 7, wherein the subset of state information displayed in said displaying a modified GUI step is associated with a distributed switch processor from the plurality of distributed switch processors.

9. The method of claim 7, wherein the subset of state information displayed in said displaying a modified GUI step is associated with a hub interconnecting the plurality of distributed switch processors.

10. The method of claim 7, wherein the subset of state information displayed in said displaying a modified GUI step is associated with a connection between a distributed switch processor from the plurality of distributed switch processors to the hub.

11. The method of claim 7, wherein the subset of state information displayed in said displaying a modified GUI step corresponds to a physical hardware layout of a portion of the distributed switch.

12. A method for supervising a distributed switch having a plurality of interconnected, distributed switch processors, comprising the steps of:

receiving a request from a workstation for state information;

sending state information to the workstation from a first distributed switch processor within the plurality of distributed switch processors, the state information allowing the workstation to construct a graphical user interface (GUI) and to display the GUI showing the state information about a distributed switch processor of the plurality of distributed switch processors to the user, said plurality of distributed switch processors being grouped into a plurality of subsets, each subset of said plurality of subsets having at least one distributed switch processor, each subset of said plurality of subsets being associated with a different switch function, the at least one distributed switch processor of each subset to perform one specialized function of a plurality of specialized functions;

receiving at the first distributed switch processor a first instruction from the workstation based on a command from a user through the GUI; and sending a second instruction from the first distributed switch processor to the plurality of distributed switch processors based on the first instruction received in said receiving at the first distributed switch processor a first instruction step.

13. The method of claim 12, wherein said sending state information step repeated with updated state information based on the second instruction sent in said sending a second instruction step.

14. The method of claim 12, wherein a subset of the plurality of subsets is associated with administrative processing.

15. The method of claim 14, wherein the request received in said receiving a request step is received at a distributed switch processor within the subset associated with administrative processing.

16. An apparatus for supervising a distributed switch having a plurality of distributed switch processors, comprising:

a workstation having a processor, a computer-readable memory, a switch port coupled to a distributed switch processor of the plurality of distributed switch processors, and a databus coupling the processor, the computer-readable memory, and the switch port;

said workstation receiving state information from the distributed switch processor, said workstation constructing a graphical user interface (GUI) using the state information, said workstation displaying the GUI showing the state information of the plurality of distributed switch processors to the user, said plurality of distributed switch processors being grouped into a plurality of subsets, each subset of said plurality of subsets having at least one distributed switch processor, the at least one distributed switch processor of each subset to perform one specialized function of a plurality of specialized functions, each subset of said plurality of subsets being associated with a different switch function, said workstation receiving a command from the user through the GUI, said workstation sending an instruction to the distributed switch based on the received command.

17. An apparatus for providing state information on a distributed switch to a workstation, comprising:

a plurality of distributed switch processors;

a first distributed switch processor of said plurality of distributed switch processors being coupled to the workstation;

the first distributed switch processor receiving a request from the workstation for state information;

the first distributed switch processor sending state information to the workstation, the state information allowing the workstation to construct a graphical user interface (GUI) and to display the GUI showing state information about a distributed switch processor of said plurality of distributed switch processors to the user, said plurality of distributed switch processors being grouped into a plurality of subsets, each subset of said plurality of subsets having at least one distributed switch processor, each subset of said plurality of subsets being associated with a different switch function, the at least one distributed switch processor of each distributed switch function subset to perform one specialized function of a plurality of specialized functions;

the first distributed switch processor receiving a first instruction from the workstation based on a command from a user through the GUI, and the first distributed switch processor sending a second instruction from the first distributed switch to the plurality of distributed switch processors based on the first instruction.

18. The apparatus of claim 17, wherein a subset of the plurality of subsets is associated with call processing.

19. The apparatus of claim 17, wherein a subset of the plurality of subsets is associated with signaling.

20. The apparatus of claim 17, wherein a subset of the plurality of subsets is associated with administrative processing.

21. The apparatus of claim 17, wherein a subset of the plurality of subsets is associated with gateway connections.

22. A method of supervising a distributed switch having a plurality of distributed switch processors, the method comprising:

receiving state information at a workstation from a first distributed switch processor and a second distributed switch processor within the plurality of distributed switch processors, the first distributed switch processor to perform a first specialized function of a plurality of specialized functions the second distributed switch processor to perform a second specialized function of the plurality of specialized functions, the state information including first distributed switch processor status information and second distributed switch processor status information;

constructing a graphical-user interface (GUI) at the workstation using the state information, the constructing a GUI including constructing a first distributed switch function GUI component based at least in part on the first distributed switch processor status information, and constructing a second distributed switch function GUI component based at least in part on the second distributed switch processor status information; and displaying the GUI at the workstation, the GUI including the first distributed switch function GUI component and the second distributed switch function GUI component.

23. The method of claim 22, wherein the first distributed switch function GUI component is associated with a distributed switch administrative processing function.

24. The method of claim 22, wherein the first distributed switch function GUI component is associated with a distributed switch call processing function.

25. The method of claim 22, wherein the first distributed switch function GUI component is associated with a distributed switch signaling function.

26. The method of claim 22, wherein the first distributed switch function GUI component is associated with a distributed switch gateway connections function.

* * * * *